(12) United States Patent
Jeong

(10) Patent No.: US 12,377,864 B2
(45) Date of Patent: Aug. 5, 2025

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventor: Yongseok Jeong, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 355 days.

(21) Appl. No.: 18/076,557

(22) Filed: Dec. 7, 2022

(65) Prior Publication Data
US 2023/0174080 A1 Jun. 8, 2023

(30) Foreign Application Priority Data
Dec. 8, 2021 (KR) .................. 10-2021-0174919

(51) Int. Cl.
*B60W 50/00* (2006.01)
*B60W 50/08* (2020.01)
*B60W 50/14* (2020.01)
*G01C 21/36* (2006.01)

(52) U.S. Cl.
CPC ...... *B60W 50/0098* (2013.01); *B60W 50/085* (2013.01); *B60W 50/14* (2013.01); *G01C 21/3626* (2013.01); *B60W 2050/146* (2013.01)

(58) Field of Classification Search
CPC ........... B60W 50/0098; B60W 50/085; B60W 50/14; B60W 21/3626; B60W 2050/146; G01C 21/3626

USPC .......................................................... 701/49
See application file for complete search history.

(56) References Cited

U.S. PATENT DOCUMENTS

| | | | | |
|---|---|---|---|---|
| 6,629,029 | B1 * | 9/2003 | Giles | G01M 17/007 |
| | | | | 73/114.61 |
| 6,741,920 | B1 * | 5/2004 | Otto | B60R 16/037 |
| | | | | 340/5.6 |
| 10,449,957 | B2 * | 10/2019 | Nagy | B60W 40/09 |
| 10,850,709 | B1 * | 12/2020 | Nagata | B60R 25/241 |
| 11,008,784 | B2 * | 5/2021 | Fabre | E05B 81/56 |
| 11,364,926 | B2 * | 6/2022 | Lerzer | B60K 35/29 |
| 11,618,349 | B1 * | 4/2023 | Saini | B60N 2/0276 |
| | | | | 701/49 |
| 11,663,899 | B2 * | 5/2023 | Patne | B60R 25/245 |
| | | | | 340/5.61 |

(Continued)

*Primary Examiner* — Luis A Martinez Borrero
(74) *Attorney, Agent, or Firm* — MCDONNELL BOEHNEN HULBERT & BERGHOFF LLP

(57) ABSTRACT

A vehicle includes a plurality of electronic control units (ECUs), a communicator configured to communicate with a digital key including user personalization data, and a processor configured to, based on the communicator receiving first user personalization data for a first user from a first digital key including the first user personalization data, control the plurality of ECUs to perform a function corresponding to first setting information included in the first user personalization data, and based on the communicator receiving second user personalization data for a second user from a second digital key including the second user personalization data, control the plurality of ECUs to perform a function corresponding to second setting information included in the second user personalization data.

19 Claims, 10 Drawing Sheets

(56) References Cited

U.S. PATENT DOCUMENTS

| | | | | |
|---|---|---|---|---|
| 11,760,252 B2* | 9/2023 | Jeong | B60Q 1/2669 | 340/468 |
| 11,858,460 B2* | 1/2024 | Oh | B60R 25/25 | |
| 2010/0087987 A1* | 4/2010 | Huang | B60W 40/08 | 701/49 |
| 2012/0053794 A1* | 3/2012 | Alcazar | B60N 2/0273 | 701/49 |
| 2013/0328699 A1* | 12/2013 | Schramm | B60W 50/14 | 340/905 |
| 2015/0095190 A1* | 4/2015 | Hammad | G06Q 20/227 | 701/1 |
| 2015/0197205 A1* | 7/2015 | Xiong | B60R 16/037 | 701/49 |
| 2015/0210287 A1* | 7/2015 | Penilla | B60N 2/0024 | 701/49 |
| 2016/0055691 A1* | 2/2016 | Jeong | G07C 9/20 | 340/5.61 |
| 2017/0349142 A1* | 12/2017 | Krishnan | B60R 25/24 | |
| 2017/0369052 A1* | 12/2017 | Nagy | B60W 40/09 | |
| 2019/0226245 A1* | 7/2019 | Fabre | B60R 25/241 | |
| 2019/0291719 A1* | 9/2019 | Tiziani | B60K 35/22 | |
| 2019/0392107 A1* | 12/2019 | Ricci | G06F 21/44 | |
| 2021/0049385 A1* | 2/2021 | Pinto | B60R 16/037 | |
| 2021/0061226 A1* | 3/2021 | Jeong | B60R 25/31 | |
| 2021/0096629 A1* | 4/2021 | Thivierge, Jr. | G07C 9/00309 | |
| 2021/0253119 A1* | 8/2021 | Lerzer | B60K 35/29 | |
| 2022/0058329 A1* | 2/2022 | Ricci | G06F 21/44 | |
| 2022/0072991 A1* | 3/2022 | Jeong | H04B 17/318 | |
| 2022/0109662 A1* | 4/2022 | Jenkins | H04W 12/35 | |
| 2022/0398911 A1* | 12/2022 | Patne | B60R 25/245 | |
| 2023/0047680 A1* | 2/2023 | Wilson | H04W 12/61 | |
| 2023/0095845 A1* | 3/2023 | Wilson | G06V 20/59 | 701/1 |
| 2023/0274629 A1* | 8/2023 | Patne | B60R 25/102 | 340/5.61 |

\* cited by examiner

SMART PHONE
( NFC + BLE + UWB )

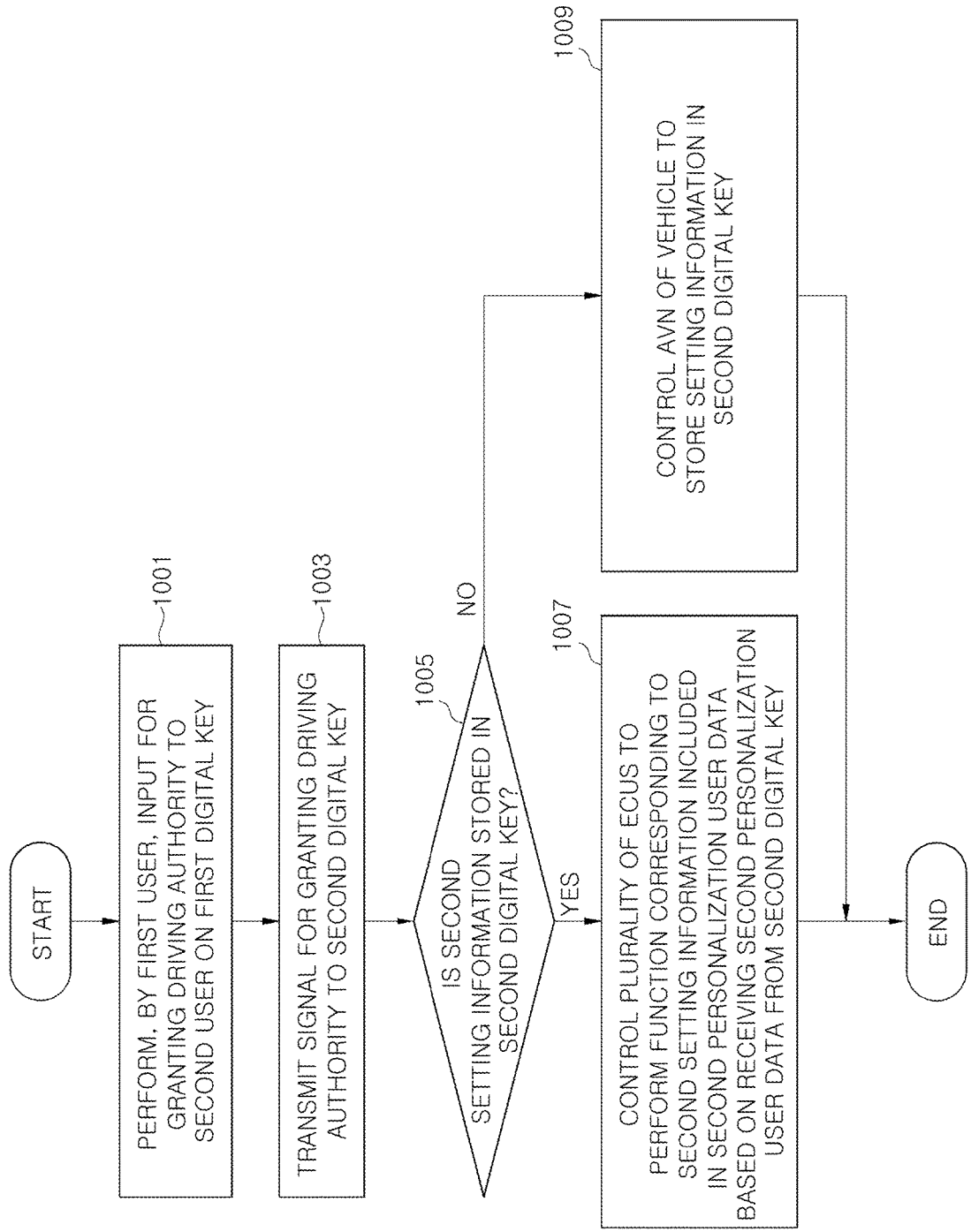

VEHICLE AND METHOD OF CONTROLLING THE SAME

CROSS REFERENCE TO RELATED APPLICATIONS

This application is based on and claims priority under 35 U.S.C. § 119 to Korean Patent Application No. 10-2021-0174919, filed on Dec. 8, 2021 in the Korean Intellectual Property Office, the disclosure of which is incorporated herein by reference.

BACKGROUND

1. Field

The disclosure relates to a vehicle capable of personalizing the vehicle according to a user and a method of controlling the same.

2. Description of the Related Art

A digital key refers to an application or card key capable of opening a vehicle door and starting a vehicle using a smart phone, and technologies for interworking with a vehicle using a digital key are gradually developing.

The conventional technology is implemented to store vehicle user's personal setting information in the vehicle, and thus has a difficulty in servicing an additional user who may temporarily driving the vehicle, such as a substitute driver or a valet driver.

In addition, when the substitute driver or a valet driver drives the vehicle without changing setting values of the vehicle to eliminate the inconvenience of the vehicle owner, there is an increasing risk of an accident.

SUMMARY

Therefore, it is an object of the disclosure to provide a vehicle capable of storing a personal preference setting value in a digital key system rather than in the vehicle, and when authenticating the authority of a substitute driver or valet driver, transmitting a setting value stored in a digital key to the vehicle so that a user who currently drives the vehicle may be provided with appropriate settings, and a method of controlling the same.

It is another object of the disclosure to provide a vehicle capable of, upon termination of a vehicle driving by a temporary driver, such as a substitute driver, automatically restoring to the existing setting value set by the vehicle owner, thereby minimizing the inconvenience and risk of the vehicle owner, and a method of controlling the same.

The technical objectives of the disclosure are not limited to the above, and other objectives may become apparent to those of ordinary skill in the art based on the following descriptions.

According to an aspect of the disclosure, there is provided a vehicle including a plurality of electronic control units (ECUs), a communicator configured to communicate with a digital key including user personalization data, and a processor configured to, based on the communicator receiving first user personalization data for a first user from a first digital key including the first user personalization data, control the plurality of ECUs to perform a function corresponding to first setting information included in the first user personalization data, and based on the communicator receiving second user personalization data for a second user from a second digital key including the second user personalization data, control the plurality of ECUs to perform a function corresponding to second setting information included in the second user personalization data.

The communicator may be configured to, upon the first user performing an input, on the first digital key, for granting a driving authority of the second user, transmit a signal for granting the driving authority to the second digital key of the second user.

Upon the communicator transmitting the signal for granting the driving authority to the second digital key, the processor may be configured to, based on receiving, by the communicator, the second user personalization data from the second digital key including the second user personalization data, control the plurality of ECUs to perform the function corresponding to the second setting information included in the second user personalization data.

The processor may be configured to, when setting information is not stored in the second digital key, control an audio video navigation (AVN) of the vehicle to store the setting information in the second digital key.

The setting information may include setting information related to at least one of: a height of a seat of the vehicle, a distance between the seat and a pedal, an inclination of a backrest of the seat, a position of an outside mirror; a height of a steering wheel, a distance to the steering wheel, or a height of a headrest.

The communicator may be configured to, at a time of transmitting the signal for granting the driving authority to the second digital key of the second user, transmit information about a driving destination input by the first user together with the signal.

The processor may be configured to control an audio video navigation (AVN) of the vehicle so that route guidance information about the driving destination input by the first user is displayed.

The communicator may be configured to, upon arrival at the driving destination, transmit a signal for recovering the driving authority granted to the second digital key of the second user to the second digital key.

The processor may be configured to, upon the communicator transmitting the signal for recovering the driving authority granted to the second digital key of the second user to the second digital key, control the plurality of ECUs to perform the function corresponding to the first setting information stored in the first digital key of the first user.

The communicator may include one of an ultra-wide band (UWB) antenna, a Bluetooth low energy (BLE) antenna, or a wireless power consortium (WPC)/near field communication (NFC) antenna.

According to another aspect of the disclosure, there is provided a method of controlling a vehicle, the method including communicating with a digital key including user personalization data, based on receipt of first user personalization data for a first user from a first digital key including the first user personalization data, controlling a plurality of electronic control units (ECUs) to perform a function corresponding to first setting information included in the first user personalization data, and based on receipt of second user personalization data for a second user from a second digital key including the second user personalization data, controlling the plurality of ECUs to perform a function corresponding to second setting information included in the second user personalization data.

The method may further include, upon the first user performing an input, on the first digital key, for granting a driving authority of the second user, transmitting a signal for granting the driving authority to the second digital key of the second user.

The method may further include, upon the transmitting of the signal for granting the driving authority to the second digital key, controlling, based on receipt of the second user personalization data from the second digital key including the second user personalization data, the plurality of ECUs to perform the function corresponding to the second setting information included in the second user personalization data.

The method may further include, when setting information is not stored in the second digital key, controlling an audio video navigation (AVN) of the vehicle to store the setting information in the second digital key.

The setting information may include setting information related to at least one of a height of a seat of the vehicle, a distance between the seat and a pedal, an inclination of a backrest of the seat, a position of an outside mirror; a height of a steering wheel, a distance to the steering wheel, or a height of a headrest.

The transmitting of the signal for granting the driving authority to the second digital key may include transmitting information about a driving destination input by the first user together with the signal for granting the driving authority to the second digital key of the second user.

The method may further include controlling an audio video navigation (AVN) of the vehicle so that route guidance information about the driving destination input by the first user is displayed.

The method may further include, upon arrival at the driving destination, transmitting a signal for recovering the driving authority granted to the second digital key of the second user to the second digital key.

The method may further include, upon the transmitting of the signal for recovering the driving authority granted to the second digital key of the second user to the second digital key, controlling the plurality of ECUs to perform the function corresponding to the first setting information stored in the first digital key of the first user.

BRIEF DESCRIPTION OF THE FIGURES

These and/or other aspects of the disclosure will become apparent and more readily appreciated from the following description of the embodiments, taken in conjunction with the accompanying drawings of which:

FIGS. 9 and 10 are flowcharts showing a method of controlling a vehicle according to an embodiment.

DETAILED DESCRIPTION

Figure 1:
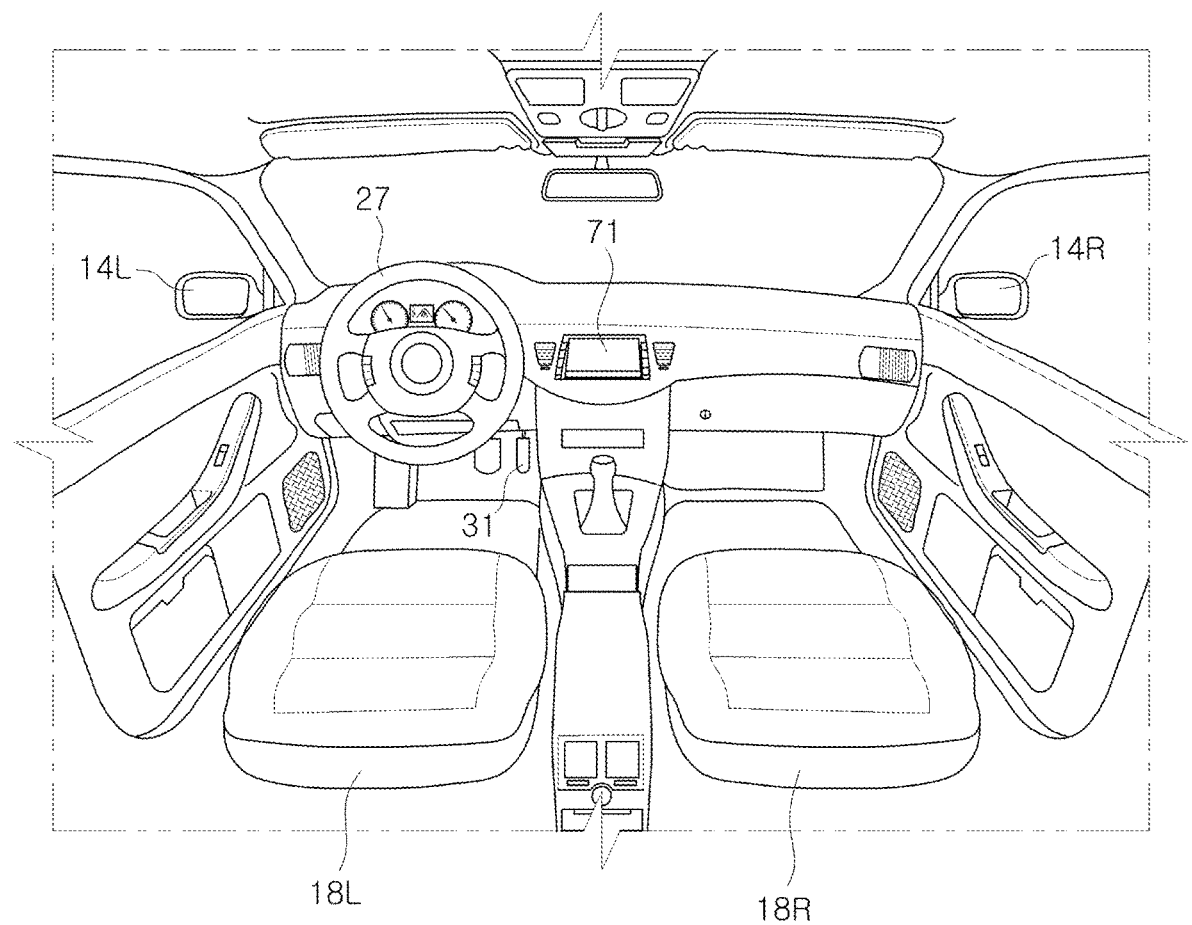
FIG. 1 is a diagram illustrating the interior of a vehicle according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements.

In the specification, it will be understood that, when a member is referred to as being "on/under" another member, it may be directly on/under the other member, or one or more intervening members may in addition be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

FIG. 1 is a diagram illustrating the interior of a vehicle according to an embodiment.

The interior of a vehicle 10 may include a dashboard on which various devices for a driver to manipulate the vehicle 10 may be installed, a driver's seat on which the driver of the vehicle 10 may sit, a cluster on which operation information of the vehicle 10, etc. may be displayed, and an Audio Video Navigation (AVN) device 71 (FIGS. 5-7) for providing audio and video functions as well as a road guidance function to provide route guidance information according to a driver's manipulation command.

The dashboard may be provided to protrude from a lower side of a windscreen toward the driver, and allow the driver to manipulate various devices installed on the dashboard while looking ahead.

The driver's seat may be provided at a rear side of the dashboard so that the driver may drive the vehicle 10 while keeping the eyes on the front of the vehicle 10 and various devices on the dashboard with a stable posture.

The cluster may be provided on the dashboard to face the driver's seat and may include a driving speed gauge indicating the driving speed of the vehicle 10 and a revolution per minute (rpm) gauge indicating the rotation speed of a power unit. In addition, the cluster may be provided using various display panels to display various types of information as well as information about the vehicle 10.

The AVN device 71 may include a display for displaying information about a road being travelled on by the vehicle 10 or a route to a destination that the driver desires to reach, and a speaker for outputting a sound according to a driver's manipulation command. There is a recent trend to install an AVN device 71, in which an audio device, a video device, and a navigation device are integrated, in the vehicle 10.

The AVN device 71 may be installed in a center fascia. In this case, the center fascia refers to a control panel part in the dashboard located between the driver's seat and the front passenger's seat, an area in which the dashboard and the shift lever vertically may meet each other, and not only the AVN device 71 but also a controller of an air conditioner and a heater, a cigar jack, an ashtray, a cup holder, etc. may be installed. In addition, the center fascia may also serve to divide the driver's seat and the passenger seat together with a center console.

In addition, a separate jog dial for various operation manipulations including the AVN device 71 may be provided.

In addition, the vehicle 10 may include a windshield that provides the driver with a front view of the vehicle 10, and a side mirror 14 that provides the driver with a rear view of the vehicle 10. The side mirror 14 may include a left side mirror 14L provided on the left side of the vehicle 10 and a right side mirror 14R provided on the right side of the vehicle 10, and may allow the driver to obtain visual information of the side and rear of the vehicle 10.

The vehicle 10 may include a door and an openable and closeable window for each passenger seat. In addition, the vehicle 10 may be provided with a sound outputter capable of outputting a sound, and the sound outputter may be a speaker. The sound outputter may output a sound required for performing an audio function, a video function, a navigation function, and other additional functions.

For example, the sound outputter may be provided in each of the left door and the authority door, and may be provided in other areas, such as the door of the rear seat and the dashboard, when needed.

The dashboard may be provided with a steering wheel 27 formed on a side facing the driver's seat, and a key groove formed in an area adjacent to the steering wheel 27 and into which a remote control device may be inserted. When the remote control device is inserted into the key groove or authentication between the remote control device and the vehicle 10 is completed through a wireless communication network, the remote control device and the vehicle 10 may be connected to each other.

In addition, the dashboard may be provided with a start button for turning on/off the ignition of the vehicle 10, and when a remote control device is inserted into the key groove, or authentication between the remote control device and the vehicle 10 through a wireless communication network succeeds, the ignition of the vehicle 10 may be turned on by the start button being pressed by a user.

Meanwhile, the vehicle 10 may be equipped with an air conditioner to perform both heating and cooling, and the heated or cooled air may be discharged through a ventilation hole to control the temperature inside the vehicle 10.

As described above, the vehicle 10 may include components having various functions, and some of the components may have setting values changed according to the preference of a user who drives the vehicle 10. Hereinafter, a process of the setting value of the vehicle 10 being changed according to the user of the vehicle 10 will be described in detail.

Figure 2:
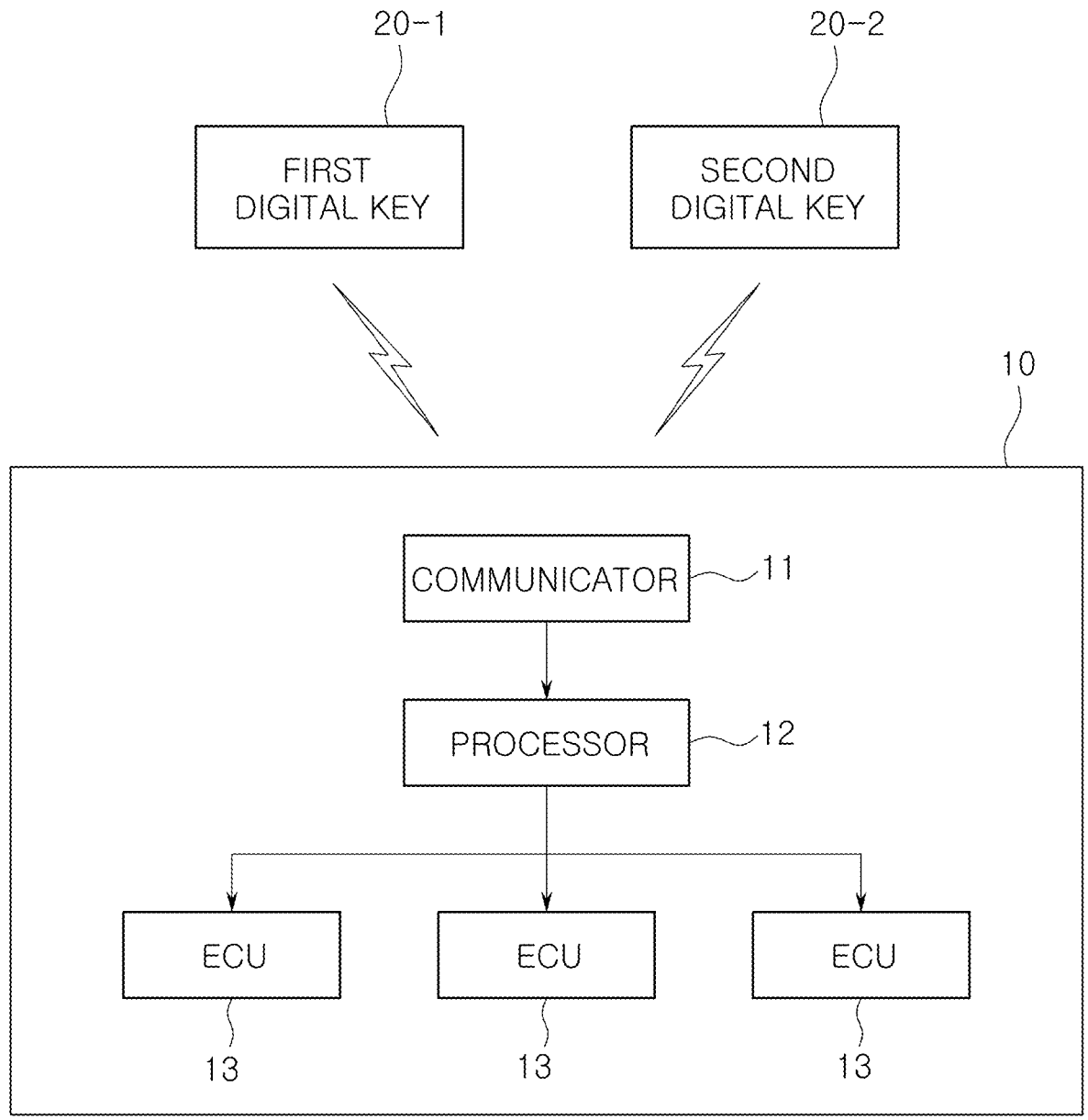
FIG. 2 is a diagram illustrating a control block diagram of a vehicle according to an embodiment.

FIG. 2 is a diagram illustrating a control block diagram of a vehicle according to an embodiment.

Referring to FIG. 2, the vehicle 10 may include a communicator 11, a processor 12, and a plurality of electronic control units (ECUs) 13, and a controller may include the processor 12 and a memory.

The communicator 11 may communicate with a digital key 20 including personalization data of a user.

That is, the communicator 11 may receive personalization data from the digital key 20 of the user, and as will be described below, may transmit a signal for granting or recovering a driving authority to the digital key 20, The communicator 11 may include one of an ultra-wide band (UWB) antenna, a Bluetooth low energy (BLE) antenna or a wireless power consortium (WPC)/near field communication (NFC) antenna.

The controller may include the memory that memorizes a control program and control data for controlling the plurality of ECUs 13, and the processor 12 for generating a control signal according to the control program and control data stored in the memory. The memory and the processor 12 may be provided integrally or separately.

In the memory, programs and data for performing a function corresponding to setting information received from the digital key 20 of the user.

The memory may include volatile memories, such as a static random access memory (S-RAM) or a dynamic random access memory (D-RAM for temporarily storing data. In addition, the memory may include non-volatile memories, such as Read Only Memory (ROM), Erasable Programmable Read Only Memory (EPROM), and Electronically Erasable Programmable Read Only Memory (EEPROM) for storing data for a long period of time.

The processor 12 may include various logic circuits and arithmetic circuits, and may process data according to a program provided from the memory and generate a control signal according to a result of the processing.

For example, the processor 12 may be configured to, based on the communicator 11 receiving first user personalization data from a first digital key 20-1 including the first user personalization data, control the plurality of ECUs 13 to perform a function corresponding to first setting information included in the first user personalization data.

In addition, the processor 12 may be configured to, based on the communicator 11 receiving second user personalization data from a second digital key 20-2 including the second user personalization data, control the plurality of ECUs 13 to perform a function corresponding to second setting information included in the second user personalization data.

That is, the processor 12 may be configured to, upon reception of user personalization data stored in the digital key 20 of each user, control the plurality of ECUs 13 included in the vehicle 10 to perform a function corresponding to user personal setting information included in the user personalization data. The user personal setting information will be described below.

Figure 3:
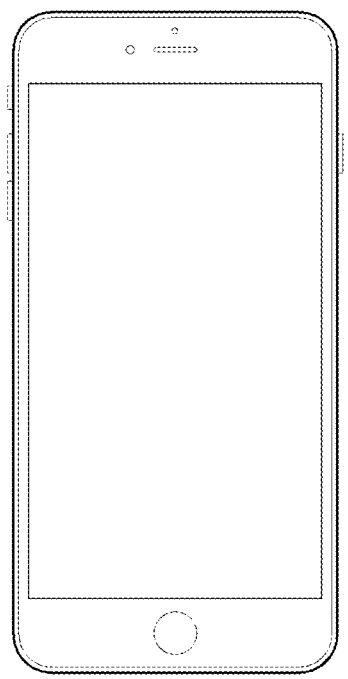
FIG. 3 is a diagram illustrating a smart phone as an example of a digital key according to an embodiment.

FIG. 3 is a diagram illustrating a smart phone as an example of a digital key according to an embodiment.

The digital key 20 refers to an application or card key configured to open the door of the vehicle 10 and start the vehicle 10 using a smart phone, and may be variously provided as long as it can include an application or card key capable of opening the door of the vehicle 10 and starting the vehicle 10, without being limited to a smart phone.

However, for the sake of convenience of description, the following description will be made assuming that the digital key 20 is provided as a digital key using a smart phone.

The user may unlock the door of the vehicle 10 or start the vehicle 10 using the digital key 20. In addition, according to the embodiment of the disclosure, the user may store personal setting information of the vehicle 10 preferred by the user in the digital key 20.

In addition, the digital key 20 may be used when a first user of the vehicle 10 grants a second user an authority to drive. Details thereof will be described below.

Figure 4:
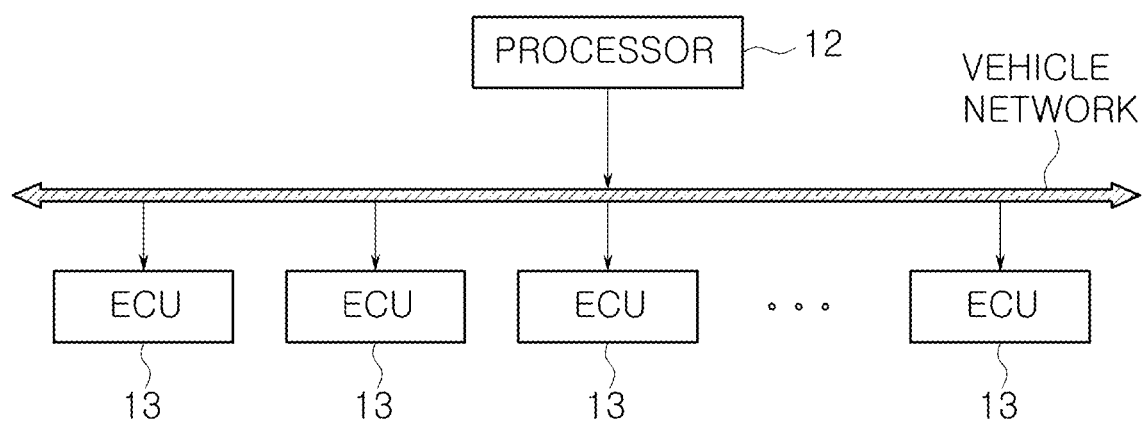
FIG. 4 is a diagram illustrating an example in which a processor controls a plurality of ECUs according to an embodiment.

FIG. 4 is a diagram illustrating an example in which a processor controls a plurality of ECUs according to an embodiment.

The processor 12 may generate a control signal for controlling the plurality of ECUs 13 to perform a function corresponding to personal setting information included in user personalization data based on the communicator 11 receiving the user personalization data from the digital key 20.

The processor 12 and the plurality of ECUs 13 may communicate with each other through a communication network. For example, electronic and installed parts may transmit and receive data through Ethernet, Media Oriented Systems Transport (MOST), Flexray, Controller Area Network (CAN), and Local Interconnect Network (LIN).

The setting information may include setting information related to at least one of: the height of the seat of the vehicle 10, the distance between the seat and the pedal, the inclination of the seat back, the position of the outside mirror; the height of the steering wheel; the distance to the steering wheel, or the height of the headrest.

The setting information is not limited to the above, and may include various functions affecting the passenger seated in the passenger seat.

As described above, the processor 12 may control the plurality of ECUs 13 to perform a function corresponding to the setting information included in the user personalization user data received from the digital key 20. Hereinafter, a detailed process of receiving personalization data from the digital key 20 and performing a function corresponding to setting information included in the personalization data will be described.

Figure 5:
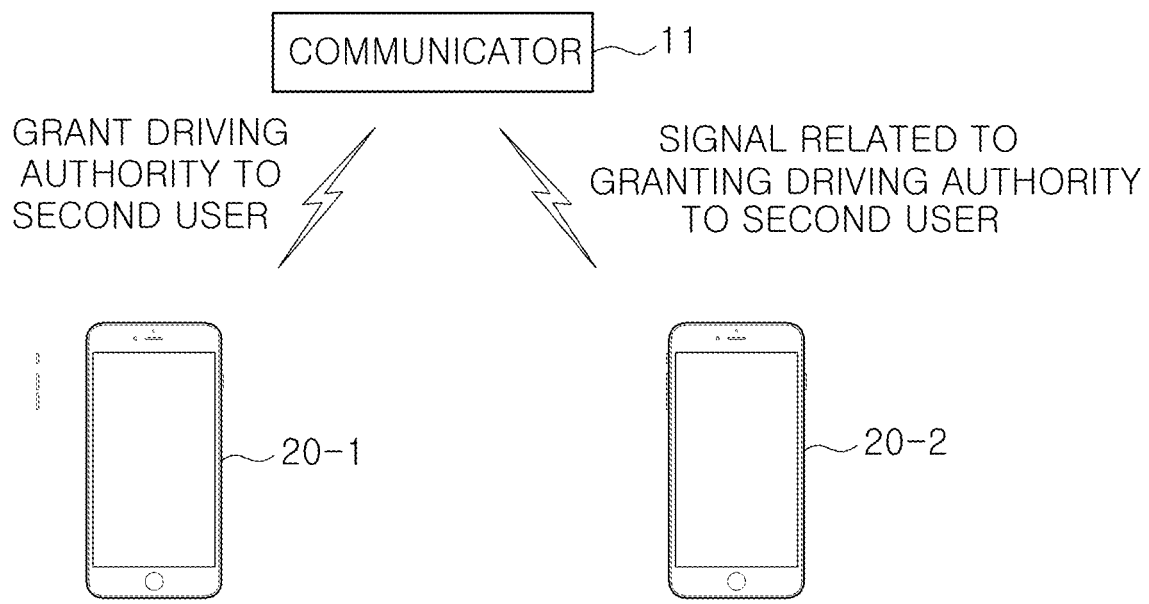
FIG. 5 is a diagram illustrating an example in which first and second digital keys communicate with a communicator according to an embodiment.

FIG. 5 is a diagram illustrating an example in which first and second digital keys communicate with a communicator according to an embodiment.

The first user of the vehicle 10 may grant a driving authority of the vehicle 10 to a substitute driver or a valet driver. The first user of the vehicle 10 may be the owner of the vehicle 10.

The first user of the vehicle 10 may perform an input, on his/her digital key 20, for granting the driving authority of to second user. The second user of the vehicle 10 may be a substitute driver or a valet driver of the vehicle 10.

The communicator 11 may, upon the first user performing the input on the first digital key 20-1 for granting the driving authority to the second user, transmit a signal for granting the driving authority to the second digital key 20-2 of the second user.

The second digital key 20-2 may, upon receiving the signal regarding the driving authority from the communicator 11, receive various functions related to the vehicle 10, such as opening the door of the vehicle 10 or starting the engine, In this case, the communicator 11 may receive the personalization data of the second user from the second digital key 20-2, so that various devices of the vehicle 10 may operate to perform functions corresponding to second setting information included in the personalization data of the second user stored in the second digital key 20-2.

Specifically, in a case in which the communicator 11 transmits the signal for granting the driving authority to the second digital key 20-2, the processor 12 may, based on the communicator 11 receiving second user personalization data from the second digital key 20-2 including the second user personalization data, control the plurality of ECUs 130 to perform the function corresponding to second setting information included in the second user personalization data.

That is, various setting values stored in the digital key of the second user, to which the first user grants the driving authority of his/her own vehicle 10, are applied to the vehicle 10 of the first user so that the second user may drive the vehicle 10 in an optimal environment that is suitable for the second user.

As described above, a user of the vehicle 10 may drive the vehicle 10 to which setting values suitable for the user's preference are applied. Hereinafter, the personal setting information will be described in detail.

Figure 6:
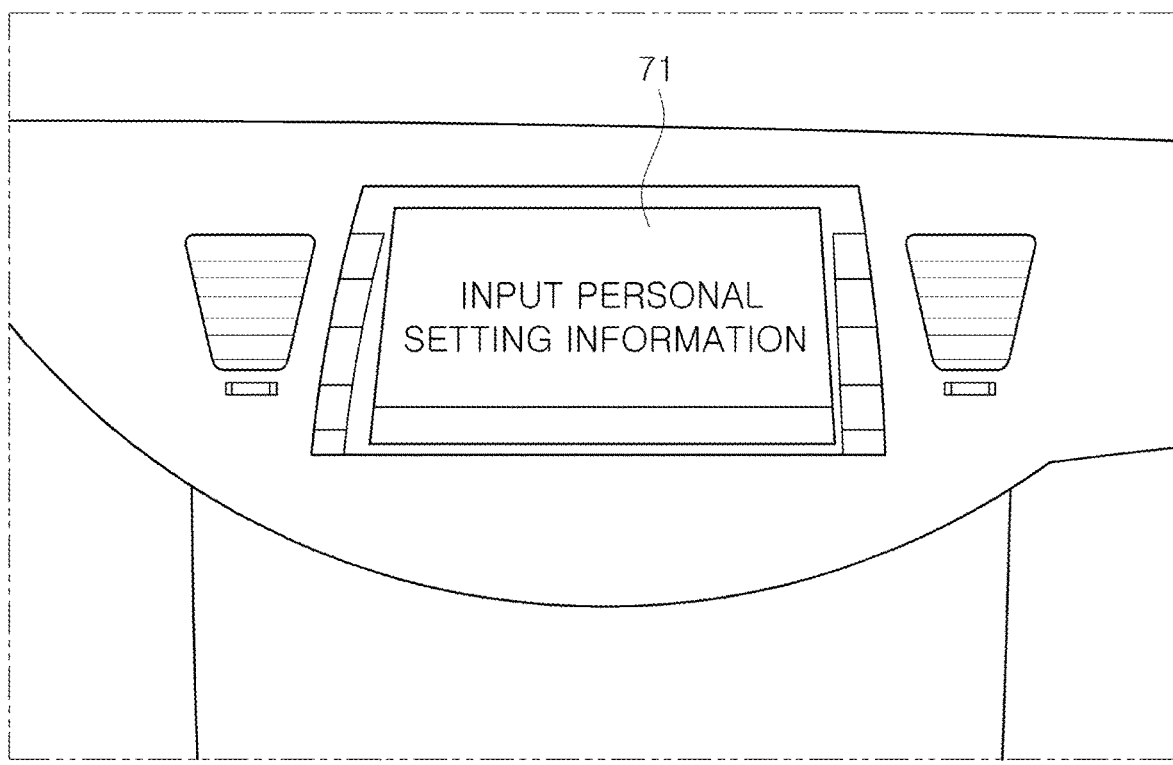
FIG. 6 is a diagram illustrating a screen of an AVN for inputting personal setting information according to an embodiment.

FIG. 6 is a diagram illustrating a screen of an AVN for inputting personal setting information according to an embodiment.

As described above, in a case in which the communicator 11 transmits the signal for granting the driving authority to the second digital key 20-2, the processor 12 may, based on the communicator 11 receiving second user personalization data from the second digital key 20-2 including the second user personalization data, control the plurality of ECUs 13 to perform a function corresponding to second setting information included in the second user personalization data.

However, there may be a case in which setting information is not included in the second user personalization data of the second digital key 20-2, such as because the second user does not store the setting information.

In this case, the processor 12 may control the AVN 71 of the vehicle 10 to newly store setting information in the second digital key 20-2.

Specifically, a screen for setting personal setting information may be displayed on the screen of the AVN 71 of the vehicle 10 so that the second user may set various types of personal setting information through an inputter and the information may be store in the second digital key 20-2.

The inputter may be implemented in various types, such as a touch panel of a screen of the AVN 71, a separate button, and the like.

Hereinafter, user's personal setting information of the vehicle 10 will be described in detail.

The setting information may include the height of the seat of the vehicle 10, the distance between the seat and the pedal, the inclination of the seat back, the position of the outside mirror, the height of the steering wheel, the distance to the steering wheel, or the height of the headrest. In addition, the disclosure is not limited thereto and may further include setting information for various components of the vehicle 10.

By adjusting various components of the vehicle 10 to suit the preferences of the vehicle 10 user, the user may operate the vehicle 10 in an optimal environment.

In addition, in storing the setting values, relative values may be stored rather than absolute values. That is, since the height of the vehicle 10, the height of the ceiling, the size of the seat, etc. are all different between vehicles, the user may store the respective relative values such that an initially set driving posture and view are secured to be the same.

When setting the seat height, the distance value between the ceiling and the seat of the vehicle 10 may be stored. Accordingly, the driver's view may be provided to start from a constant height with respect to a distance value to the ceiling.

When setting the seat distance, the distance value between the pedal and the backrest may be stored. Accordingly, the distance at which the driver manipulates the pedal may be provided to be the same between all vehicles 10.

When the inclination of the seat backrest is set, an angle value between the seat and the backrest may be stored.

When setting the position of the outside mirror, the angle between the vehicle 10 and the outside mirror may be calculated and set. For example, left and right outside mirrors may be adjusted such that an image of about ⅕ of the vehicle is formed on the left/right outside mirrors, and the horizontal line is positioned at the center of the outside mirror based on a stored relative height value of the headrest.

When setting the height of the steering wheel, a height difference value between the seat and the steering wheel may be stored. Accordingly, the height of the user's arm may be positioned to be the same.

When setting the distance of the steering wheel, the distance value between the seat and the backrest may be stored. Accordingly, the degree of bending of the user's arm may be provided to be the same.

When setting the height of the headrest, the distance value between the ceiling of the vehicle 10 and the headrest may be stored.

Since relative values are stored in storing the setting values of the vehicle 10 as described above, the same view and driving posture may be secured in all vehicle types regardless of the vehicle type, so that the user of the vehicle 10 may drive the vehicle 10 in the same environment.

The following description will be made in relation to a process in which, when assuming that the second user of the vehicle 10 is a substitute driver, the substitute driver starts and finishes the driving of the vehicle 10 by setting a driving destination together.

Figure 7:
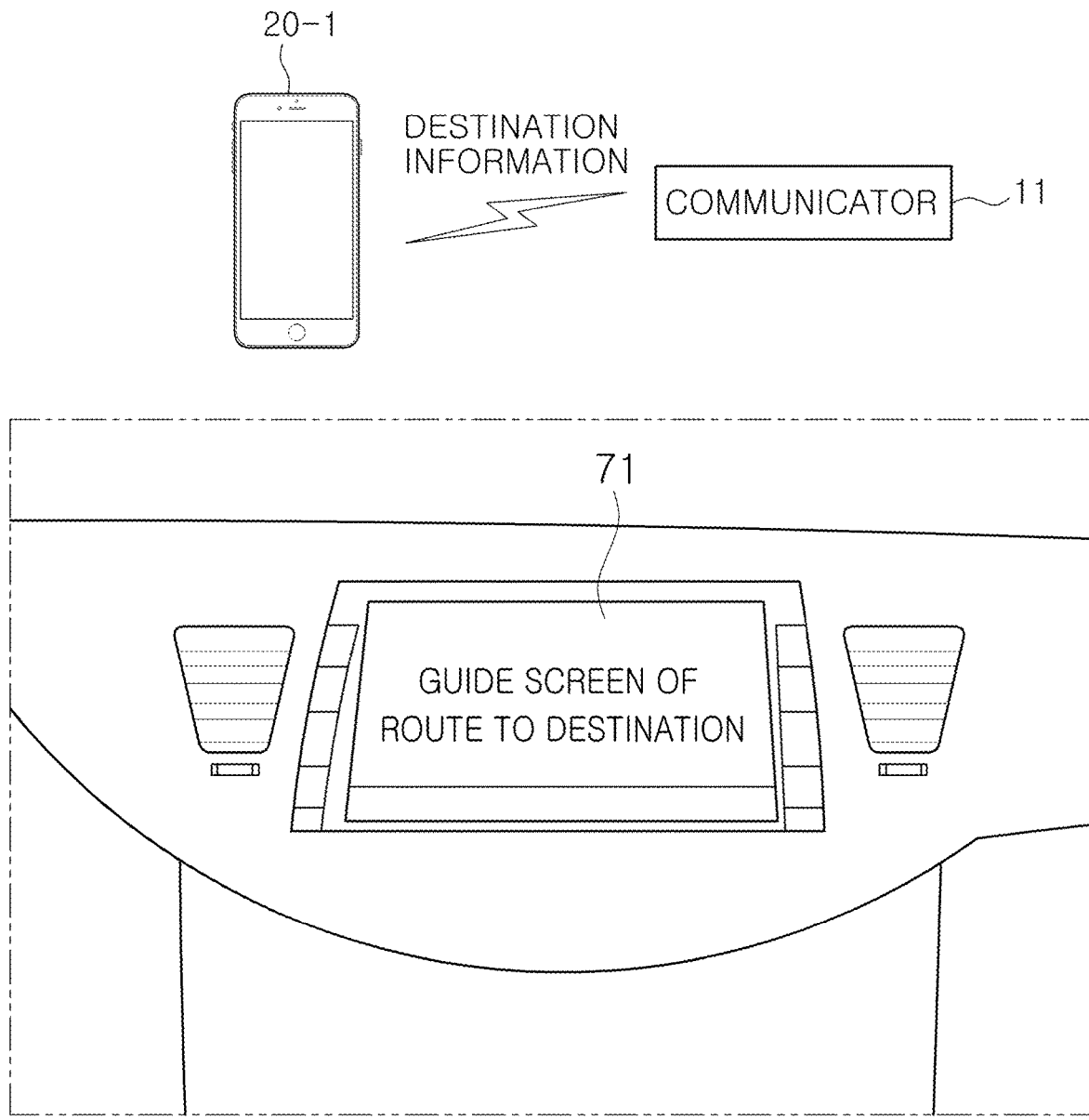
FIG. 7 is a diagram illustrating an example in which destination information is transmitted together with the granting of an authority by a communicator according to an embodiment.

FIG. 7 is a diagram illustrating an example in which destination information is transmitted together with the granting of an authority by a communicator according to an embodiment.

When the second user of the vehicle 10 is a substitute driver, the second user needs to drive the first user, who is the owner of the vehicle 10, to a specific destination (e.g., the residence) by the vehicle 10, and the second user may have a convenience in driving the vehicle 10 by identifying the accurate destination.

Accordingly, when the first user perform an input for granting the driving authority to the second user, the first user may input the destination information of the first user together with the granting of the driving authority to the second user, who is a substitute driver.

Accordingly, the communicator 11 may, at a time of transmitting a signal for granting the driving authority to the second digital key 20-2 of the second user, transmit information about the driving destination input by the first user together with the signal.

The processor 12 may control the AVN 71 of the vehicle 10 to display route guidance information regarding the driving destination input by the first user.

That is, since the first user inputs the driving destination together with the granting of the driving authority to the second user, the AVN 71 may display a guidance screen of a route to the destination when the second user starts driving without separately inputting a destination.

Accordingly, more accurate destination information may be delivered to the second user.

Hereinafter, a process of recovering the driving authority of the substitute driver when the substitute driver completes the driving to the driving destination will be described.

Figure 8:
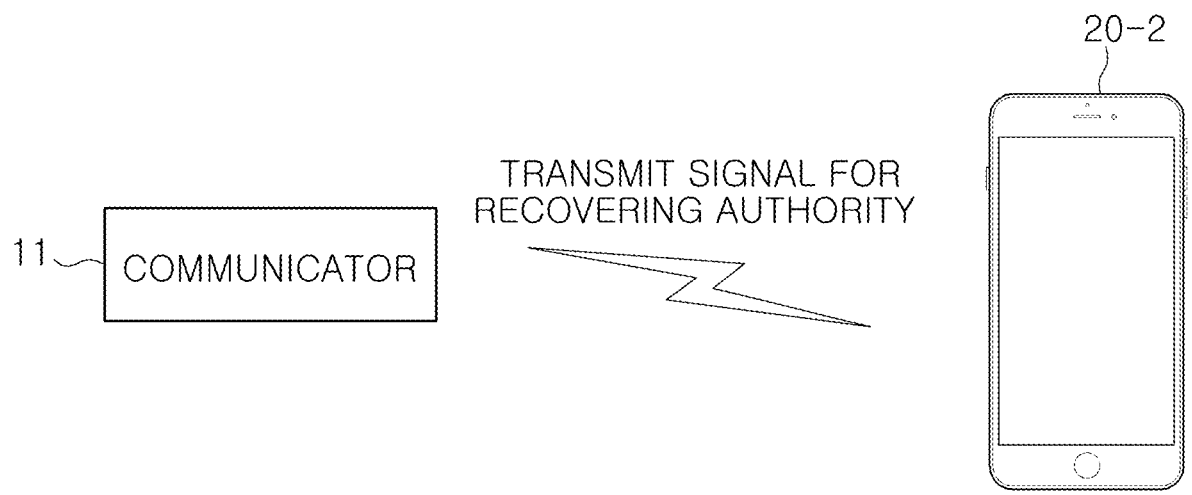
FIG. 8 is a diagram illustrating an example in which a communicator transmits a signal for recovering an authority of a second digital key according to an embodiment.

FIG. 8 is a diagram illustrating an example in which a communicator transmits a signal for recovering an authority of a second digital key according to an embodiment.

When the second user granted the driving authority of the vehicle 10 arrives at the driving destination by driving the vehicle 10, the communicator 11 may transmit, to the second digital key 20-2, a signal for recovering the driving authority granted to the second digital key 20-2 of the second user.

That is, upon determining that the vehicle 10 driven by the second user has arrived at the driving destination entered in advance, the communicator may transmit a signal for automatically recovering the driving authority granted to the second digital key 20-2 of the second user without receiving a separate input for recovering the driving authority.

However, after the driving of the vehicle 10 by the second user is terminated, the first user, who is the owner of the vehicle 10 may have a hassle in driving the vehicle 10, due to performing a rework on the vehicle 1 such that the setting information of the first user is applied to the vehicle 10 that uses the setting information of the second user.

Accordingly, in response to the driving authority of the second digital key 20-2 being lost when the signal for recovering the driving authority to the second digital key 20-2 is transmitted to the second digital key 20-2, the processor 12 may control the plurality of ECUs 13 to perform a function corresponding to the first setting information stored in the first digital key 20-1 of the first user.

That is, when the driving authority of the second user is recovered, the setting information previously set by the first user, which is the original owner of the vehicle 10, is automatically applied, thereby eliminating a hassle of owner of the vehicle 10 in changing the setting information of the vehicle 10 again.

Figure 9:
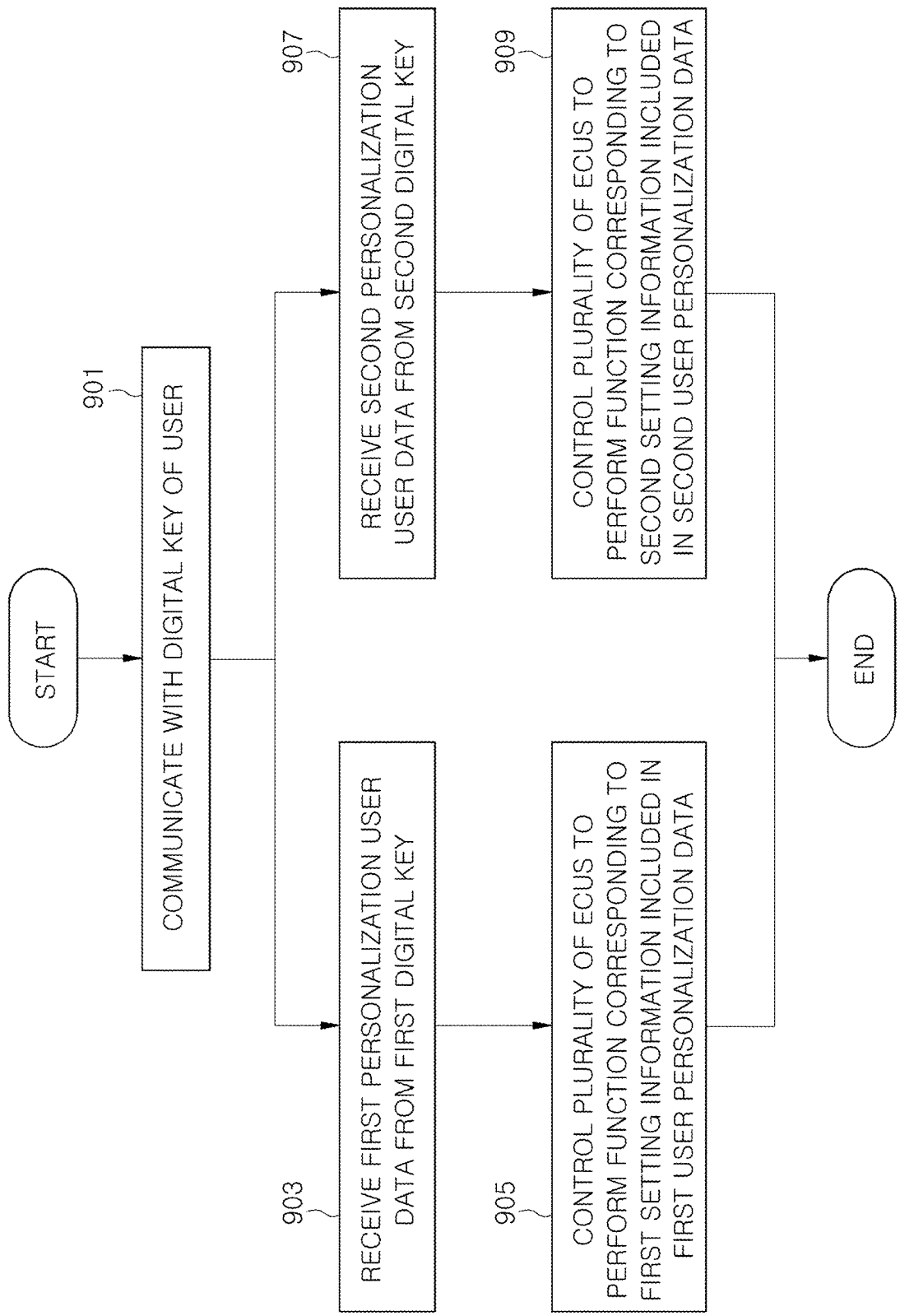

FIGS. 9 and 10 are flowcharts illustrating a method of controlling a vehicle according to an embodiment.

The communicator 11 of the vehicle 10 may communicate with the digital key 20 including user personalization data at 901.

The communicator 11 may receive first personalization user data from the first digital key 20-1 including the first personalization user data at 903.

The processor 12 may, based on the receipt of the first user personalization data from the first digital key 20-1 including the first user personalization data, control the plurality of ECUs 13 to perform a function corresponding to first setting information included in the first user personalization data at 905.

The communicator 11 may receive second personalization user data from the second digital key 20-2 including the second personalization user data at 907.

The processor 12, based on the receipt of the second user personalization data from the second digital key 20-2 including the second user personalization data, control the plurality of ECUs 13 to perform a function corresponding to second setting information included in the second user personalization data at 909.

Hereinafter, a process in which the first user grants the driving authority of the vehicle 10 to the second user and the setting information stored in the second digital key 20-2 of the second user is applied to the vehicle 10 will be described.

The first user may perform an input on his/her first digital key 20-1 for granting the driving authority to the second user at 1001.

The communicator 11 may transmit a signal related to granting the driving authority to the second digital key 20-2 of the second user at 1003.

In a case in which second setting information is stored in the second digital key 20-2 (YES in operation 1005), the plurality of ECUs 13 may be controlled to, based on the receipt of the second personalization user from the second digital key 20-2 including the second personalization user data, perform a function corresponding to the second setting information included in the second personalization user data at 1007.

In a case in which second setting information is not stored in the second digital key 20-2 (NO in operation 1005), the AVN 71 of the vehicle 10 may be controlled to store setting information in the second digital key 20-2 at 1009.

As is apparent from the above, according to the vehicle and the method of controlling the same, personal setting information of a user is stored in a digital key carried by a user, rather than in the vehicle, so that any user having a digital key, even a temporary driver, such as a substitute driver, a valet driver, etc., can be provided with a function of personalizing the vehicle settings.

In addition, when granting an authority to a substitute driver, destination information is transmitted together with the granting of the authority to the substitute driver, so that accurate destination information can be delivered to the substitute driver, and when the temporary driving of the substitute driver, etc. is terminated, the existing setting value set by the owner of the vehicle is restored, so that the inconvenience of the vehicle owner due to a setting change by the temporary user can be resolved.

Although embodiments of the disclosure have been described for illustrative purposes, those skilled in the art will appreciate that various modifications, additions and substitutions are possible, without departing from the scope and spirit of the disclosure. Therefore, embodiments of the disclosure have not been described for limiting purposes.

The invention claimed is:

1. A vehicle comprising:
a plurality of electronic control units (ECUs);
a communicator configured to communicate with a digital key including user personalization data; and
a processor configured to, based on the communicator receiving first user personalization data for a first user from a first digital key including the first user personalization data, control the plurality of ECUs to perform a function corresponding to first setting information included in the first user personalization data, and based on the communicator receiving second user personalization data for a second user from a second digital key including the second user personalization data, control the plurality of ECUs to perform a function corresponding to second setting information included in the second user personalization data;
wherein the processor is configured to:
receive information on granting a driving authority of the second digital key of the second user through a short-range communication network from a first mobile terminal including the first digital key;
transmit the information on granting the driving authority of the second digital key of the second user through the short-range communication network to a second mobile terminal including second digital key; and
receive the second user personalization data through the short-range communication network from the second mobile terminal;
wherein the received information on granting the driving authority of the second digital key is input using the mobile terminal including the first digital key by the first user.

2. The vehicle of claim 1, wherein upon the first user performing an input on the first digital key, for granting a driving authority of the second user, the communicator is further configured to transmit a signal for granting the driving authority to the second digital key of the second user.

3. The vehicle of claim 2, wherein upon the communicator transmitting the signal for granting the driving authority to the second digital key,
the processor is configured to, based on receiving, by the communicator, the second user personalization data from the second digital key including the second user personalization data, control the plurality of ECUs to perform the function corresponding to the second setting information included in the second user personalization data.

4. The vehicle of claim 3, wherein the processor is configured to, when setting information is not stored in the second digital key, control an audio video navigation (AVN) of the vehicle to store the setting information in the second digital key.

5. The vehicle of claim 4, wherein the setting information includes setting information related to at least one of: a height of a seat of the vehicle, a distance between the seat and a pedal; an inclination of a backrest of the seat; a position of an outside mirror; a height of a steering wheel; a distance to the steering wheel, or a height of a headrest.

6. The vehicle of claim 3, wherein the communicator is configured to, at a time of transmitting the signal for granting the driving authority to the second digital key of the second user, transmit information about a driving destination input by the first user together with the signal.

7. The vehicle of claim 6, wherein the processor is configured to control an audio video navigation (AVN) of the vehicle so that route guidance information about the driving destination input by the first user is displayed.

8. The vehicle of claim 6, wherein the communicator is further configured to, upon arrival at the driving destination, transmit a signal for recovering the driving authority granted to the second digital key of the second user to the second digital key.

9. The vehicle of claim 8, wherein the processor is configured to, upon the communicator transmitting the signal for recovering the driving authority granted to the second digital key of the second user to the second digital key, control the plurality of ECUs to perform the function corresponding to the first setting information stored in the first digital key of the first user.

10. The vehicle of claim 2, wherein the communicator includes one of a ultra-wide band (UWB) antenna, a Bluetooth low energy (BLE) antenna, or a wireless power consortium (WPC)/near field communication (NFC) antenna.

11. A method of controlling a vehicle, the method comprising:
communicating, by a communicator, with a digital key including user personalization data;

based on receipt of first user personalization data for a first user from a first digital key including the first user personalization data, controlling, by a processor, a plurality of electronic control units (ECUs) to perform a function corresponding to first setting information included in the first user personalization data; and based on receipt of second user personalization data for a second user from a second digital key including the second user personalization data, controlling the plurality of ECUs to perform a function corresponding to second setting information included in the second user personalization data;

wherein the communicating with the digital key includes:
  receiving information on granting a driving authority of the second digital key of the second user through a short-range communication network from a first mobile terminal including the first digital key;
  transmitting the information on granting the driving authority of the second digital key of the second user through the short-range communication network to a second mobile terminal including second digital key; and
  receiving the second user personalization data through the short-range communication network from the second mobile terminal; and
  wherein the received information on granting the driving authority of the second digital key is input using the mobile terminal including the first digital key by the first user.

12. The method of claim 11, further comprising, upon the first user performing an input, on the first digital key, for granting a driving authority of the second user, transmitting a signal for granting the driving authority to the second digital key of the second user by the controller.

13. The method of claim 12, further comprising, upon the transmitting of the signal for granting the driving authority to the second digital key, controlling, by the processor, based on receipt of the second user personalization data from the second digital key including the second user personalization data, the plurality of ECUs to perform the function corresponding to the second setting information included in the second user personalization data.

14. The method of claim 13, further comprising, when setting information is not stored in the second digital key, controlling, by the processor an audio video navigation (AVN) of the vehicle to store the setting information in the second digital key.

15. The method of claim 14, wherein the setting information includes setting information related to at least one of: a height of a seat of the vehicle, a distance between the seat and a pedal; an inclination of a backrest of the seat; a position of an outside mirror; a height of a steering wheel; a distance to the steering wheel, or a height of a headrest.

16. The method of claim 13, the transmitting of the signal for granting the driving authority to the second digital key includes transmitting information about a driving destination input by the first user together with the signal for granting the driving authority to the second digital key of the second user.

17. The method of claim 16, further comprising controlling an audio video navigation (AVN) of the vehicle so that route guidance information about the driving destination input by the first user is displayed.

18. The method of claim 16, further comprising, upon arrival at the driving destination, transmitting a signal for recovering the driving authority granted to the second digital key of the second user to the second digital key.

19. The method of claim 18, further comprising, upon the transmitting of the signal for recovering the driving authority granted to the second digital key of the second user to the second digital key, controlling the plurality of ECUs to perform the function corresponding to the first setting information stored in the first digital key of the first user.

* * * * *